United States Patent [19]

Murai et al.

[11] Patent Number: 5,969,059
[45] Date of Patent: Oct. 19, 1999

[54] IMPREGNATION RESIN COMPOSITION

[75] Inventors: Shinji Murai, Ichikawa; Shuji Hayase, Yokohama, both of Japan

[73] Assignee: Kabushiki Kaisha Toshiba, Kawasaki, Japan

[21] Appl. No.: 09/041,794

[22] Filed: Mar. 13, 1998

[30] Foreign Application Priority Data

Mar. 14, 1997 [JP] Japan ..................... 9-061388

[51] Int. Cl.$^6$ .................................. C08F 283/00
[52] U.S. Cl. .................. 525/506; 525/524; 525/533; 528/92; 528/103; 528/112; 528/416
[58] Field of Search ................... 528/92, 103, 112, 528/416; 525/506, 524, 533

[56] References Cited

U.S. PATENT DOCUMENTS

| | | | |
|---|---|---|---|
| 3,624,032 | 11/1971 | Miyashiro et al. | 260/47 |
| 3,705,129 | 12/1972 | Murio et al. | 260/47 |
| 4,137,275 | 1/1979 | Smith et al. | 260/830 |
| 4,246,161 | 1/1981 | Smith et al. | 528/92 |
| 5,034,493 | 7/1991 | Tani et al. | 528/92 |
| 5,218,018 | 6/1993 | Tominaga et al. | 523/403 |
| 5,378,736 | 1/1995 | Fujiwa et al. | 522/170 |
| 5,712,331 | 1/1998 | Ryang | 523/400 |

FOREIGN PATENT DOCUMENTS

| | | |
|---|---|---|
| 48-005799 | 8/1973 | Japan . |
| 54-047753 | 4/1979 | Japan . |
| 61-026619 | 2/1986 | Japan . |
| 62-007721 | 1/1987 | Japan . |
| 1-118564 | 5/1989 | Japan . |
| 2-088629 | 3/1990 | Japan . |
| 3-296526 | 12/1991 | Japan . |
| 6-339255 | 12/1994 | Japan . |

*Primary Examiner*—Randy Gulakowski
*Attorney, Agent, or Firm*—Oblon, Spivak McClelland, Maier & Neustadt, P.C.

[57] ABSTRACT

An impregnation resin composition comprising an alicyclic epoxy compound, an acid anhydride, an aluminum compound having an organic group, and butylglycidyl ether, wherein the alicyclic epoxy compound contains not more than 30 ppm in concentration of Na ion component.

12 Claims, No Drawings

IMPREGNATION RESIN COMPOSITION

BACKGROUND OF THE INVENTION

This invention relates to an impregnation resin composition, and in particular, to an impregnation resin composition which is suited for use in an insulation coil of a revolving electric equipment for vehicle or general industry, and of a stationary induction electric apparatus such as a transformer.

With the current trend to further miniaturize a revolving electric equipment for vehicle or general industry, an insulation coil of the revolving electric equipment is increasingly required to be excellent in insulating properties.

The insulating layer for such an insulation coil has been manufactured as follows. Namely, a woven fabric or a nonwoven fabric consisting of an inorganic fiber such as a glass fiber and polyamide fiber, or of an organic fiber; or an organic polymer film is employed as a base material. Then, a laminated mica is superimposed on the base material to obtain a mica sheet, which is then employed, together with a binder and a mica tape made from the mica sheet, to cover the surface of the coil conductor thereby to form a covering layer of desired thickness. This covering layer is then impregnated in a vacuum or under a pressurized condition with a thermosetting impregnation varnish of low viscosity, such as unsaturated polyester, epoxy resin or silicone resin, the impregnated varnish being subsequently cured to obtain an insulating layer.

As for this impregnation varnish, epoxy-based resins are generally employed because they are well-balanced in various properties. On the other hand, as for the binder for the mica insulating tape, a material which is not so sticky or a solid material is preferred in view of workability. It has been proposed, for the purpose of improving the heat resistance of the insulating layer, to employ, as an insulating tape for winding around the coil conductor, a mica insulating tape comprising a mixture of a solid epoxy resin compound exhibiting a high heat resistance, maleimide and a binder, or a mixture of epoxy resin, maleimide and a binder, and to employ an epoxy/acid anhydride-curing type varnish for the impregnation of this mica insulating tape.

When an acid anhydride is employed as a cure accelerator for epoxy resin, it is possible to decrease the viscosity of epoxy resin and also to form a cured resin layer which is excellent in electric properties as well as mechanical properties.

In the manufacture of an insulation coil of electric equipment where high heat resistance is demanded, a varnish of relatively high viscosity is employed with a view to enhance the heat resistance of the insulating layer. However, in order to improve the impregnation property of varnish in relative to an insulating tape, the varnish is generally heated in an actual impregnation step so as to lower the viscosity of the varnish. However, once a varnish is heated in this manner, it is impossible to avoid the problem that the storage life of the varnish would be shortened.

On the other hand, in the case of the aforementioned epoxy/acid anhydride-curing type varnish, although the pot life thereof is relatively long because of its low viscosity, a relatively high temperature and a long time are required for the curing of the varnish. Therefore, a cure accelerator is generally incorporated into the varnish. However, when a cure accelerator is directly incorporated into the varnish, the viscosity of the varnish is caused to increase, thus leading to the shortening of storage life as in the case of a varnish of high viscosity.

In the process of impregnating the insulating layer of electric coil with a varnish, a coil is dipped into the varnish filled in a tank for a predetermined period of time, after which another coil is dipped likewise into the varnish, i.e. the same varnish is repeatedly used in this dipping operation. Therefore, the impregnation varnish is desired to be long in storage life, and hence a search for a latent cure accelerator for the impregnation varnish, which does not give bad influences to the storage life of the varnish is now extensively studied.

There are known various kinds of latent cure accelerator, such for example as a quaternary phosphonium compound, an imidazole compound, boron tetrafluoride amine compound, an adduct of tertiary amine with epoxy, a tetraphenyl boron complex and a metal acetylacetonate.

There is also proposed as a means for prolonging the storage life of varnish to microcapsulate a cure accelerator before it is dispersed in a varnish. In this case, the varnish containing the microcapsulated cure accelerator is heated at a temperature higher than a predetermined temperature thereby to melt the capsule, thus allowing the cure accelerator to elute into the varnish to promote the curing reaction of the varnish. However, the aforementioned method is accompanied with the following problems.

Since an impregnation varnish is to be penetrated into an insulating layer of high density, the cure accelerator is required to be completely dissolved into the varnish at an impregnation temperature. However, since the microcapsulated cure accelerator is granulated to have a predetermined particle diameter, it may not penetrate sufficiently into the interior of the insulating layer if the insulating layer is relatively large in thickness. In that case, the interior of the insulating layer may not be sufficiently cured due to an insufficiency of cure accelerator at the occasion of heat-curing. In the worst case, the resin in the varnish may be foamed, thus producing a cured product which is extremely poor in electric properties.

As mentioned above, since the storage life of varnish is shortened or the properties of cured product is deteriorated if a cure accelerator is directly incorporated into an impregnation varnish, a method of incorporating a cure accelerator into the insulating layer in advance instead of varnish has been proposed. Specifically, a method of incorporating a cure accelerator in a binder for an insulating tape, or a method of impregnating a solution of cure accelerator into an insulating tape which has been wound in advance around a coil conductor has been proposed. According to these methods, the insulating tape containing a cure accelerator is dried and then impregnated with a varnish and heat-cured.

However, there is still problems in the curing of the insulating layer impregnated in advance with a cure accelerator in that the varnish in the space (the varnish not containing the cure accelerator) between the insulating layers is caused to cure later than the curing of the portion of insulating layer (insulating base material layer) containing the cure accelerator. As a result, it is difficult to form a uniform cured insulating layer, and at the same time, the resin on the outer surface of the coil may not be satisfactorily cured.

Moreover, there is also a problem that during the process of curing the resin penetrated into the insulating base material layer by heat-treating it in a thermostatic chamber after the insulating base material layer of the coil is impregnated with a resin in an impregnation tank, the resin penetrated into the insulating base material layer may flow out before the resin is cured.

Since a thermosetting resin to be employed as an impregnation resin such as epoxy resin has a property that the viscosity thereof is temporarily lowered due to an increase in temperature thereof at the occasion of heat-curing, the run-out of the varnish in a degree during the aforementioned process of heat-curing cannot be avoided. However, if the resin is allowed to run out of the insulating base material layer, it becomes difficult to form a dense insulating layer. Additionally, if the resin is allowed to run out of the insulating base material layer, voids may be generated in the interior of the insulating layer, so that the electric properties such as corona discharge or the heat dissipation property of the coil would be extremely deteriorated.

Meantime, in view of enhancing the productivity of electric equipment, the impregnation resin is required to be not only excellent in impregnation property and in short-time curability, but also capable of forming an excellent insulating layer irrespective of the kinds of a binder-backed insulating tape.

Because of this, there has been proposed a method of incorporating a powdery latent cure accelerator not only into an insulating layer but also into an impregnation varnish in the manufacture of an insulation coil. However, even with this method, it is accompanied with the problem that the dispersion stability of cure accelerator in the varnish is poor, thus generating a sedimentation during a long period of storage.

If a cure accelerator is added in advance to a binder for the insulating layer, a solution containing the binder resin and the cure accelerator for the manufacture of an insulating tape would be gelled during a repeated use of several times. Furthermore, when an insulating tape is manufactured in this manner, the reaction of the binder would be gradually proceeded during a long period of storage, whereby the tape would become hard, thus making it difficult to wind the tape round the coil.

If an insulation coil is manufactured using such an insulating tape of poor winding workability, not only the external appearance of the resultant coil would be damaged, but also the electric and mechanical properties of the insulating layer would be deteriorated, thus deteriorating the reliability of the insulation coil. Therefore, the insulating tape prepared according to the aforementioned method is required to be stored in a low temperature atmosphere or otherwise required to be employed immediately after the manufacture thereof.

As explained above, the resin composition to be employed as an impregnation varnish for an insulation coil is required to be provided with various properties. However, an impregnation resin composition having such desired various properties as mentioned above is not available up to date.

BRIEF SUMMARY OF THE INVENTION

Accordingly, an object of the present invention is to provide an impregnation resin composition, which is excellent in long-term storage stability, in short-time curability and in impregnation property, and which is capable of exhibiting excellent electric and mechanical properties.

Namely, according to the present invention, there is provided an impregnation resin composition comprising: an alicyclic epoxy compound; an acid anhydride; an aluminum compound having an organic group; and butylglycidyl ether, wherein the alicyclic epoxy compound contains not more than 30 ppm in concentration of Na ion component.

DETAILED DESCRIPTION OF THE INVENTION

This invention will be further explained in detail with reference to the following preferred embodiments.

The alicyclic epoxy compound to be mixed in the impregnation resin composition of this invention is an alicyclic compound where the ring itself is epoxidized, as exemplified by the following general formulas (2) and (3).

(2)

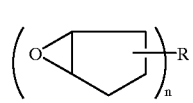

(3)

wherein R is an organic group which comprises alkyl group, an ether linkage, an ester linkage, a thioether linkage or a spiro ring, and is capable of linking two or more of epoxidized rings; n is an integer of 1 or more.

Specific examples of such an alicyclic epoxy compound are as follows.

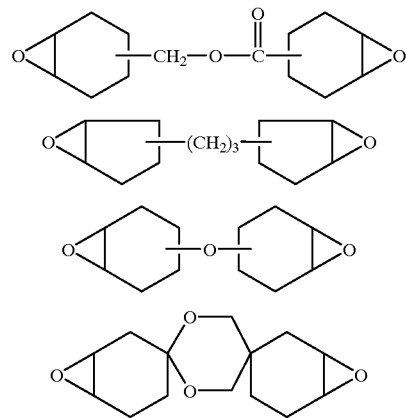

It is also possible to employ Chissonox 221 (tradename, Chisso Co., Ltd.), an alicyclic epoxy compound which is available on the market.

The aforementioned alicyclic epoxy compounds may be employed singly or in combination of two or more kinds. In particular, the compound represented by the following general formula (1) is preferable, since it can be lowered in viscosity, thus exhibiting an excellent impregnation property.

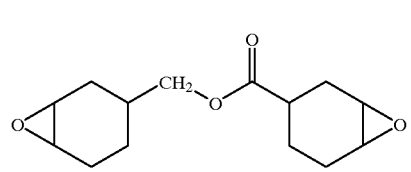

(1)

Although there is not any particular limitation regarding the epoxy equivalent of alicyclic epoxy compounds to be employed in this invention, an epoxy equivalent of 200 or less is preferable in view of promoting the curing rate of the epoxy compounds.

The mixing ratio of the alicyclic epoxy resin in the impregnation resin composition of this invention can be suitably determined by taking the viscosity of the composition into consideration. Generally, the mixing ratio of the epoxy resin in the resin composition may be in the range of from 20% to 70% based on the entire resin composition.

Most preferably, the resin composition according to this invention should not include other kinds of epoxy resin except the alicyclic epoxy compound in view of the viscosity, long-term storage stability and reactivity of the resin composition. However, as long as the effects of this invention is not hindered, a bisphenol type epoxy compound may be co-used.

In view of the storage stability of the resin composition, the alicyclic epoxy compound to be employed in this invention should be pure in a degree. Therefore, the ionic impurities in the alicyclic epoxy compound is limited in this invention, and in particular, the concentration of Na ion component should be limited to 30 ppm or less.

As for the acid anhydride constituting the curing agent in the epoxy resin composition of this invention, phthalic anhydride, hexahydrophthalic anhydride, tetrahydrophthalic anhydride, methyl-tetrahydrophthalic anhydride, methyl-hexahydrophthalic anhydride, nadic anhydride, methylnadic anhydride, chlorendic anhydride, dodecynylsuccinic anhydride, methylsuccinic anhydride, benzofenonetetracar-boxylic anhydride, pyromellitic anhydride or maleic anhydride may be employed.

The aforementioned acid anhydride may be suitably combined with an alicyclic epoxy compound. For example, Celoxide 2021P can be preferably combined with QH200.

The equivalent ratio of acid anhydride in the impregnation resin composition of this invention may be in the range of 0.2 to 1.5 based on the alicyclic epoxy, preferably 0.3 to 1.2 based on the alicyclic epoxy. If the equivalent ratio of acid anhydride is less than 0.2, the curing may become insufficient. On the other hand, if the equivalent ratio of acid anhydride exceeds over 1.5, the moisture resistance of the resin composition would be deteriorated.

The aluminum compound having an organic group that is employed as a cure accelerator in the impregnation resin composition of this invention. Specific examples of this aluminum compound are organic aluminum complex compounds wherein alkoxy, phenoxy, acyloxy, β-diketonato, or o-carbonylphenolato is linked to aluminum atom.

As for the alkoxy group to be employed herein, ones having 1 to 10 carbon atoms, such as methoxy, ethoxy, isopropoxy, butoxy or pentyloxy may be employed. As for the phenoxy group to be employed herein, o-methylphenoxy, o-methoxyphenoxy, o-nitrophenoxy or 2,6-dimethylphenoxy may be employed. As for the acyloxy group to be employed herein, a ligand such as acetato, propionato, isopropionato, butylato, stealato, ethylacetoacetato, propylacetoacetato, butylacetoacetato, diethylmalato or dipivaloylmethanato may be employed. As for the β-diketonato group to be employed herein, a ligand such as acetylacetonato, trifluoroacetylacetonato, hexafluoroacetylacetonato, acetonato, and the following ligands may be employed.

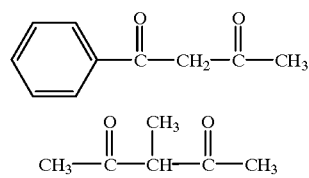

-continued

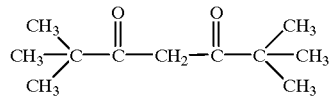

As for the o-carbonylphenolato group to be employed herein, salicylaldehydato for instance may be employed.

Specific examples of the aluminum compound wherein any one of the aforementioned organic groups is linked to aluminum atom are trismethoxy aluminum, trisethoxy aluminum, trisisopropoxy aluminum, trisphenoxy aluminum, trisparamethylphenoxy aluminum, isopropoxy-diethoxy aluminum, trisbutoxy aluminum, trisacetoxy aluminum, trisstealato aluminum, trisbutylato aluminum, trispropionato aluminum, trisisopropionato aluminum, trisacetylacetonato aluminum, tristrifluoroacetylacetonato aluminum, trishexafluoroacetylacetonato aluminum, tris-ethylacetoacetonato aluminum, trissalicylaldehydato aluminum, trisdiethylmalato aluminum, trispropylacetoac-etato aluminum, trisbutylacetoacetato aluminum, trisdipiv-aloylmethanato aluminum, trisdiacetylacetonatopiv-aloylmethanato aluminum, and the compounds represented by the following chemical formulas.

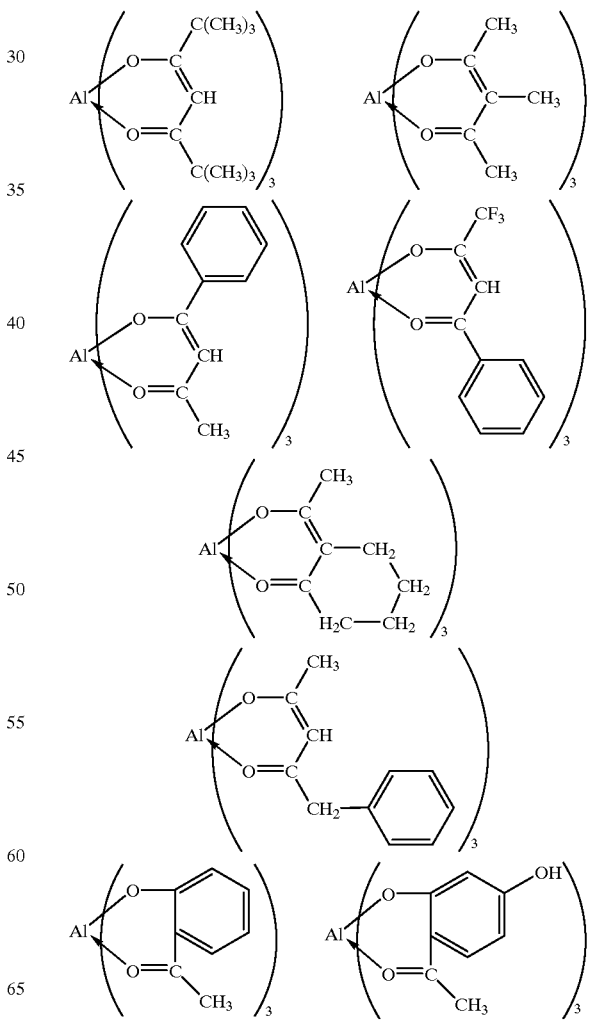

-continued

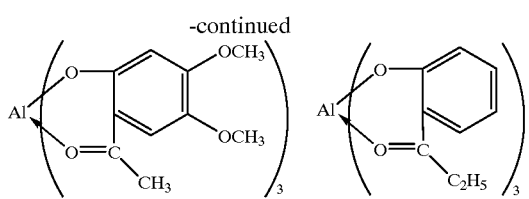

The aforementioned aluminum compounds having any one of the aforementioned organic groups may be employed singly or in combination of two or more kinds. However, in view of storage stability, the employment of aluminum trisacetylacetonate is most preferable.

The mixing ratio of the aforementioned aluminum compounds having an organic group in the resin composition should preferably be in the range of 0.001 to 1.0 part by weight, more preferably in the range of 0.005 to 0.5 part by weight based on 100 parts by weight of the total amount of the acid anhydride, alicyclic epoxy compound and butylglycidyl ether. If the mixing ratio of the aluminum compounds having an organic group is less than 0.001 part by weight, the curing of the resin composition may become insufficient. On the other hand, if the mixing ratio of the aluminum compounds having an organic group exceeds over 1.0 part by weight, the storage life may be shortened.

The butylglycidyl ether to be incorporated in the resin composition of this invention functions as a reactive diluent. The mixing ratio of butylglycidyl ether in the resin composition should preferably be in the range of 1 to 30 part by weight, more preferably in the range of 5 to 25 part by weight based on 100 parts by weight of the total amount of the acid anhydride, alicyclic epoxy compound and butylglycidyl ether. If the mixing ratio of the butylglycidyl ether is less than 1 part by weight, the storage life of the resin composition may be deteriorated. On the other hand, if the mixing ratio of butylglycidyl ether exceeds over 30 part by weight, the mechanical strength of the resultant product may be deteriorated.

The resin composition of this invention should preferably include a compound having an Si—H bond for the purpose of shortening the reaction time. Specific examples of the compound having an Si—H bond are phenyl silane, tris(2-chloroethoxy) silane, butyldimethyl silane, methylphenyl silane, dimethylphenyl silane, octyl silane, methylphenylvinyl silane, tripropyl silane, diphenyl silane, diphenylmethyl silane, tripentyloxysilane, triphenyl silane, trihexyl silane, 1,1,3,3-tetramethyl disiloxane, pentamethyl disiloxane, 1,4-bis(dimethylsilyl) benzene, 1,1,3,3,5,5-hexamethyl trisiloxane, 1,3,5,7-tetramethyl cyclotetrasiloxane, 1,1,1,3,5,7,7,7-octamethyl tetrasiloxane, tris(trimethylsiloxy) silane, 1,3,5,7,9-pentamethyl cyclopentasiloxane, decamethyl cyclopentasiloxane, etc.

The mixing ratio of the aforementioned silane compounds in the resin composition should preferably be in the range of 0.001 to 10 part by weight, more preferably in the range of 0.005 to 5 part by weight based on 100 parts by weight of the total amount of the acid anhydride, alicyclic epoxy compound and butylglycidyl ether. If the mixing ratio of the silane compounds is less than 0.001 part by weight, the effect of accelerating the reaction may be insufficient. On the other hand, if the mixing ratio of the silane compounds exceeds over 10 part by weight, the storage life may be shortened.

For the same reason as in the case of the compound having an Si—H bond, a compound having an O—O bond should preferably be included in the resin composition of this invention. Specific examples of the compound having an O—O bond are organic peroxides such as dicumyl peroxide, t-butylcumyl peroxide, di-t-butyl peroxide, t-butylperoxy-2-ethylhexanoate, t-butylperoxy-3,5,5-trimethylhexanoate, t-butylperoxylaurate, t-hexylperoxybenzoate, t-butylperoxybenzoate, t-butylperoxy-m-toluoylbenzoate, etc.

The mixing ratio of the aforementioned compounds having an O—O bond in the resin composition should preferably be in the range of 0.001 to 10 part by weight, more preferably in the range of 0.005 to 5 part by weight based on 100 parts by weight of the total amount of the acid anhydride, alicyclic epoxy compound and butylglycidyl ether. If the mixing ratio of the aforementioned compounds having an O—O bond is less than 0.001 part by weight, the effect of accelerating the reaction may be insufficient. On the other hand, if the mixing ratio of the aforementioned compounds having an O—O bond exceeds over 10 part by weight, the storage life may be shortened.

The preparation of the impregnation resin composition according to this invention can be performed either by dissolving aluminum trisacetylacetonate for instance in an acid anhydride at a temperature of 60 to 100° C. before the epoxy compound is incorporated, or by dissolving aluminum trisacetylacetonate for instance in butylglycidyl ether before the epoxy compound and an acid anhydride are incorporated.

The viscosity of the composition to be finally obtained should preferably be in the range of 20 to 500 cps. Because if the viscosity is less than 20 cps, the curing property of the composition would be deteriorated. On the other hand, if the viscosity is more than 500 cps, the impregnation property of the resin composition would be deteriorated.

The impregnation resin composition according to this invention to be prepared as mentioned above is extremely suited for use as a material for forming an insulating layer of electric insulation coil. By the way, the insulating layer of electric insulation coil can be formed by a process wherein a binder-backed insulating tape is applied at first to a coil conductor, then impregnated with the aforementioned impregnation resin composition (varnish) and heat-cured.

The binder for the insulating film to be employed in this case contains essentially the aforementioned epoxy resin. However, the binder may also contain a curing agent such as phenol resin or a solid acid anhydride. If a cure accelerator is incorporated into this insulating tape, the curing reaction of the insulation layer can be further accelerated.

Specific examples of such a cure accelerator are an imidazole-based compound; a boron tetrafluoride amine compound; a metallic complex compound such as an aluminum compound having an organic group; and a composite cure accelerator consisting of an organic aluminum compound and an organic silicone compound selected from organosiloxane and organosilane having a silanol group or a hydrolyzable group which is directly linked to a silicon atom.

The impregnation resin composition according to this invention is low in viscosity and hence excellent in impregnation property, and can be cured within a short period of time. Moreover, this resin composition according to this invention is excellent in storage life and hence the ratio of varnish to be discarded can be minimized, i.e. advantageous in economic viewpoint.

By employing an impregnation resin composition according to this invention, an excellent insulating layer can be obtained irrespective of the kinds of a binder-backed insulating tape. Further, since the aforementioned epoxy resin is incorporated in the binder of the insulating tape as mentioned above, when the resin composition of this invention comprising an alicyclic epoxy compound and an aluminum compound having an organic group is impregnated into the insulating tape, the epoxy component in the resin composition and the epoxy component in the binder of the insulating tape can be integrally cured. As a result, the property of the resultant insulation layer can be greatly improved, whereby making it possible to manufacture an insulation coil of high reliability, exhibiting excellent electric and mechanical properties upon curing.

This invention will be further explained in detail with reference to the following Examples and Comparative Examples.

The components contained in the impregnation resin composition of this invention are as follows.

(Epoxy resin)
Celoxide 2021P (an epoxy resin, Daiseru Kagaku Co., Ltd.)
  Alicyclic epoxy: epoxy equivalent, 128–140
  Viscosity: 350–450 cps
  Ionic component: 15 ppm
ERL 4221 (U.C.C. Co., Ltd.)
  Alicyclic epoxy: epoxy equivalent, 131–143
  Viscosity: 350–400 cps
  Ionic component: 47 ppm
Araldyte CY179 (epoxy resin, Chiba Guique Co., Ltd.)
  Alicyclic epoxy: epoxy equivalent, 133–143
  Viscosity: 350 cps
  Ionic component: 60 ppm
Araldyte CY175 (epoxy resin, Chiba Guique Co., Ltd.)
  Alicyclic epoxy: epoxy equivalent, 133–154
  Viscosity: 125,000–200,000 cps
Ep 806 (epoxy resin, Yuka Shell Epoxy Kabushikikaisha)
  Bisphenol F type epoxy: epoxy equivalent, 165
  Viscosity: 1,500–2,500 cps
Ep 828 (epoxy resin, Yuka Shell Epoxy Kabushikikaisha)
  Bisphenol A type epoxy: epoxy equivalent, 184–194
  Viscosity: 12,000–15,000 cps
BGE (epoxy resin, Wako Junyaku Co., Ltd.)
  Butylglycidyl ether: epoxy equivalent, 130
  Viscosity: 1 cps
YL-932 (epoxy resin, Yuka Shell Epoxy Kabushikikaisha)
  Tris[p-(2,3-epoxypropoxy) phenyl] methane: epoxy equivalent, 161
HP-4032D (epoxy resin, Dainippon Ink and Chemical Co., Ltd.)
Naphthalene ring skeleton epoxy: epoxy equivalent, 142

(Acid anhydride)
QH 200 (Nippon Zeon Co., Ltd.)
  Methyltetrahydrophthalic anhydride
  Acid anhydride equivalent, 166
  Viscosity: 30–60 cps
MH 700 (Shin Nippon Rika Co., Ltd.)
  Methylhexahydrophthalic anhydride
  Acid anhydride equivalent, 168
  Viscosity: 50–80 cps (Compound containing Si—H bond)
Phenyl silane (Shinetsu Kagaku Co., Ltd.)

(Compound containing O—O bond)
DCP (Nippon Yushi Co., Ltd.)
  Dicumyl peroxide (Cure accelerator)
Aluminum chelate A (Kawaken Fine Chemical Co., Ltd.)
  Aluminum tris(acetylacetonate)
ALCH-TR (Kawaken Fine Chemical Co., Ltd.)
  Aluminum tris(ethylacetoacetate)
AlBA: Aluminum tris(benzoylacetonate)
Al(sa)$_3$: Aluminum tris(salicylaldehydate)
  (By the way, the AlBA was obtained by allowing aluminum triisopropoxide to react with benzoylacetone in toluene anhydride under reflux and then by performing recrystallization or distillation. While, the Al(sa)$_3$ was obtained by allowing aluminum triisopropoxide to react with salicylaldehyde in toluene anhydride under reflux and then by performing recrystallization or distillation.)
2E4MZ (Shikoku Kasei Kogyo Co., Ltd.): 2-ethyl-methyl imidazole
U-CAT 5003 (Sanapro Co., Ltd.): Quaternary phosphonium salt
HX3741 (Asahi Kasei Co., Ltd.): Microcapsulated amine-based curing agent
SI-100L (Sanshin Kagaku Co., Ltd.): Onium salt (Preparation of impregnation varnish)

These components were mixed together according to the formulations shown in the following Tables 1 and 2 to prepare varnishes comprising the resin compositions of Examples (1 to 8) and of Comparative Examples (1 to 10). In the preparation of these varnishes, a predetermined quantity of a cure accelerator was mixed with BGE or an acid anhydride, and the resultant mixture was heated at a temperature of 60 to 100° C., if required, to dissolve the cure accelerator, and after being cooled to room temperature, the epoxy resin was mixed therewith.

TABLE 1

|  |  | Examples |  |  |  |  |  |  |  |
|---|---|---|---|---|---|---|---|---|---|
|  |  | 1 | 2 | 3 | 4 | 5 | 6 | 7 | 8 |
| Epoxy resin | Araldyte CY 179 | 10 | — | — | 5 | 5 | — | — | — |
|  | Celoxide 2021P | 30 | 45 | 45 | 40 | 40 | 45 | 45 | 45 |
|  | Ep806 | — | — | — | — | — | — | — | — |
|  | Ep807 | — | — | — | — | — | — | — | — |
|  | YL-932 | — | — | — | — | — | — | — | — |
|  | HP-4032D | — | — | — | — | — | — | — | — |
|  | BGE | 20 | 15 | 15 | 18 | 18 | 15 | 15 | 18 |
| Acid anhydride | QH200 | 40 | 40 | — | 37 | — | — | 40 | — |

TABLE 1-continued

|  |  | Examples | | | | | | | |
|---|---|---|---|---|---|---|---|---|---|
|  |  | 1 | 2 | 3 | 4 | 5 | 6 | 7 | 8 |
| Cure accelerator | MH700 | — | — | 40 | — | 37 | 40 | — | 37 |
|  | Aluminum chelate A | — | 0.1 | — | 0.2 | 0.1 | — | — | 0.05 |
|  | ALCH-TR | 0.1 | — | 0.1 | — | — | — | — | 0.05 |
|  | AlBA | — | — | — | — | — | 0.1 | — | — |
|  | Al(sa)$_3$ | — | — | — | — | — | — | 0.2 | — |
|  | 2E4Mz | — | — | — | — | — | — | — | — |
|  | U-CAT 5003 | — | — | — | — | — | — | — | — |
|  | HX3741 | — | — | — | — | — | — | — | — |
|  | SI-100L | — | — | — | — | — | — | — | — |

TABLE 2

|  |  | Comp. Examples | | | | | | | | | |
|---|---|---|---|---|---|---|---|---|---|---|---|
|  |  | 1 | 2 | 3 | 4 | 5 | 6 | 7 | 8 | 9 | 10 |
| Epoxy resin | Araldyte CY 179 | — | — | — | — | 5 | — | — | 45 | 5 | 47 |
|  | Celoxide 2021P | — | — | — | — | — | 45 | 47 | — | 40 | — |
|  | Ep806 | 45 | 45 | — | — | — | — | — | — | — | — |
|  | Ep807 | — | — | 45 | 45 | 40 | — | — | — | — | — |
|  | YL-932 | — | — | — | — | — | — | — | — | — | — |
|  | HP-4032D | — | — | — | — | — | — | — | — | — | — |
|  | BGE | 10 | 10 | 10 | 10 | 10 | — | — | — | — | — |
|  | PGE | — | — | — | — | — | 18 | — | 18 | 18 | — |
| Acid anhydride | QH200 | 45 | 45 | 45 | — | — | — | 53 | — | — | 53 |
|  | MH700 | — | — | — | 45 | 45 | 37 | — | 37 | 37 | — |
| Cure accelerator | Aluminum chelate A | 0.2 | — | — | — | — | 0.1 | 0.2 | — | 0.1 | 0.2 |
|  | ALCH-TR | — | — | — | — | — | — | — | 0.2 | — | — |
|  | ALBA | — | — | — | — | — | — | — | — | — | — |
|  | Al(sa)$_3$ | — | — | — | — | — | — | — | — | — | — |
|  | 2E4MZ | — | 1 | — | — | 1 | — | — | — | — | — |
|  | U-CAT 5003 | — | — | 0.5 | — | — | — | — | — | — | — |
|  | HX3741 | — | — | — | 3 | — | — | — | — | — | — |
|  | SI-100L | — | — | — | — | — | — | — | — | — | — |

Referring to Table 2, the resin composition of Comparative Example 1 did not contain an alicyclic epoxy resin, while the resin composition of Comparative Example 5 did not contain an aluminum compound having an organic group. The resin compositions of Comparative Examples 2 to 4 did not contain both alicyclic epoxy resin and aluminum compound having an organic group. The resin compositions of Comparative Examples 6 to 10 did not contain the BGE. In particular, in the cases of Comparative Examples 6, 8 and 9, the PGE was employed in place of the BGE.

Then, each varnish was investigated with respect to the storage stability, the gelling time, electric insulation property and viscosity as illustrated below, the results being summarized in the following Tables 3 and 4.

(Storage stability)

Each impregnation varnish was sampled in a 100 cc screw bottle and then left to stand at a temperature of 20° C. The storage stability of the varnish was evaluated by measuring the number days required for the varnish to reach a viscosity of 500 cps.

(Gelling time)

Each impregnation varnish was sampled in a test tube 18 mm in outer diameter to a depth of 70±2 mm, and after a glass rod was inserted into the varnish, the test tube was placed in a thermostatic oven of predetermined temperature. The gelling time of the varnish was evaluated by measuring the time when the test tube could be easily lifted up together with the glass rod.

(Electric insulation property)

Each resin composition was heated at a temperature of 150°°C. for 5 hours to cure the resin composition thereby to manufacture a resin plate having a thickness of 2 mm, and an electric insulation property test (volume resistivity at 150° C.) was performed using this resin plate according to the test method of JIS-6911.

(Viscosity)

The viscosity of each resin composition at a temperature of 25° C. was measured by making use of an E-type viscometer.

TABLE 3

|  | Examples | | | | | | | |
|---|---|---|---|---|---|---|---|---|
|  | 1 | 2 | 3 | 4 | 5 | 6 | 7 | 8 |
| Storage stability (days) | 140 | 150 | 140 | 140 | 140 | 100 | 100 | 160 |
| Gelling | 50 | 70 | 80 | 65 | 60 | 60 | 65 | 80 |

TABLE 3-continued

| | Examples | | | | | | | |
|---|---|---|---|---|---|---|---|---|
| | 1 | 2 | 3 | 4 | 5 | 6 | 7 | 8 |
| time (min.) | | | | | | | | |
| $\Omega \cdot cm$ (150° C.) | $2 \times 10^{13}$ | $2 \times 10^{13}$ | $3 \times 10^{13}$ | $2.4 \times 10^{13}$ | $2.5 \times 10^{13}$ | $4 \times 10^{13}$ | $2 \times 10^{13}$ | $2 \times 10^{13}$ |
| Viscosity (cps) (25° C.) | 60 | 30 | 30 | 45 | 45 | 30 | 30 | 40 |

TABLE 4

| | Comp. Examples | | | | | | | | | |
|---|---|---|---|---|---|---|---|---|---|---|
| | 1 | 2 | 3 | 4 | 5 | 6 | 7 | 8 | 9 | 10 |
| Storage stability (days) | 30 | 3 | 7 | 7 | 3 | 80 | 30 | 70 | 80 | 25 |
| Gelling time (min.) | 180 | 2 | 5 | 2 | 2 | 80 | 50 | 90 | 80 | 50 |
| $\Omega \cdot cm$ (150° C.) | $1 \times 10^{10}<$ | $1 \times 10^{11}$ | $1 \times 10^{11}$ | $4 \times 10^{11}$ | $1 \times 10^{10}$ | $2 \times 10^{9}$ | $1 \times 10^{8}$ | $1 \times 10^{9}$ | $2 \times 10^{9}$ | $2 \times 10^{8}$ |
| Viscosity (cps) (25° C.) | 70 | 70 | 80 | 80 | 90 | 50 | 250 | 50 | 50 | 240 |

As clearly seen from Tables 3 and 4, an increase of viscosity was not recognized in the epoxy resin compositions of this invention (Examples 1 to 8) even after 100 days of testing period, thus indicating an excellent storage stability. By contrast, in the cases of the epoxy resin compositions of Comparative Examples (1 to 10), the viscosity of some of them was increased up to 500 cps after only 3 days of testing period. Even in cases of Comparative Examples 6 and 9 which indicated most excellent storage stability among all of Comparative Examples, the storage stability of the resin compositions was deteriorated after 80 days of testing period, thus indicating very poor storage stability as compared with the varnishes according to this invention.

The resin composition of Comparative Example 1 containing no alicyclic epoxy compound indicated an extremely long gelling time, i.e. 180 minutes, while the resin composition of Comparative Example 5 where the aluminum compound having an organic group was not included therein indicated a very poor storage stability, i.e. only 3 days. In the cases of Comparative Examples 2, 3 and 4, although the gelling time was not more than 5 minutes, but the storage stability thereof was very poor. It will be seen from the results of Comparative Examples 6, 8 and 9 that if the BGE was not incorporated in the resin composition, the viscosity of the resin composition would be extremely increased, and that even if the PGE is mixed therein, the storage stability thereof cannot be sufficiently improved. In any case, it is impossible in the cases of the resin compositions of Comparative Examples to realize an excellent storage stability for a long period of time and at the same time a short gelling time as realized by the resin compositions of this invention.

On the other hand, the impregnation varnishes of the present invention (Examples 1 to 8) indicated an excellent storage stability as mentioned above and at the same time the gelling time was all 80 minutes or less, thus extremely shortening the gelling time. Additionally, the resin compositions of this invention exhibited a suitable degree of viscosity for using them as an impregnation material.

As explained above, it is only possible to realize an excellent storage stability for a long period of time and at the same time a short gelling time by the employment of the impregnation resin composition of this invention comprising an alicyclic epoxy resin as an epoxy resin, an aluminum complex as a cure accelerator, and the BGE as a reactive diluent.

Since most of the impregnation varnishes of Examples 1 to 8 indicated a viscosity of 45 cps or less at 25° C., it was expected that these varnishes would exhibit an excellent impregnation property as they were employed for impregnating the insulating tape thereby to obtain an insulation layer of insulation coil.

The cured materials obtained by the curing of the compositions of Comparative Examples showed $10^{11}$ ($\Omega \cdot cm$) or less in volume resistivity at 150° C., whereas the cured materials obtained by the curing of the varnishes of this invention showed $2 \times 10^{13}$ ($\Omega \cdot cm$) or more in volume resistivity at 150° C., thus indicating an excellent insulating property even at high temperature regions.

It will be seen from the above results that the impregnation resin composition of this invention comprising an alicyclic epoxy resin as an epoxy resin, and an aluminum compound having an organic group as a cure accelerator is excellent in all aspects such as a long-term storage stability, a short-time curing property and an excellent impregnation property, and that the cured product to be obtained from this resin composition is very excellent in electric insulation property.

Next, insulation coils were manufactured employing the resin compositions of Examples and Comparative Examples together with an insulating tape to investigate the properties of the coils. The insulating tape employed in this case was prepared as follows. Namely, a binder resin (YL-932, HP-4032D, etc.) was dissolved in methylethyl ketone (solvent) or tetrahydrofuran (solvent) and then adjusted of its composition so as to obtain a composition where the concentration of non-volatile components is approximately 30%. The resultant composition was then employed for adhering an unbaked soft laminated mica sheet onto a glass cloth, after which a solvent in the composition was allowed to evaporate whereby obtaining a glass cloth-backed mica tape (insulating base material). Then, after this insulating base material was conditioned such that the content of binder (non-volatile components) in the base material becomes about 20% (based on the total weight of the insulating base material), the base material was cut into an insulating tape 25 mm in width.

(Preparation of insulation coil)

The insulating tape prepared in this manner was overlappingly wound four times around an aluminum square rod (6×25×100 mm) with an overlapping width of ½ between neighboring windings thereby to manufacture a test insulation coil provided with an insulating layer. Several samples were picked up from the resin compositions of Examples (1 to 8) and Comparative Examples (1 to 10) and then employed for impregnating the test insulation coils in a vacuum or under a pressurized condition. Thereafter, the impregnated resin compositions were heated and cured at a temperature of 150° C. for 6 hours to manufacture model coils of Examples (9 to 16) and Comparative Examples (11 to 14).

The following Tables 5 and 6 show the binder resins employed for the insulating tape, the cure accelerator incorporated in the binder, and the resin compositions impregnated into the insulating tape.

TABLE 5

|  | Examples | | | |
| --- | --- | --- | --- | --- |
|  | 9 | 10 | 11 | 12 |
| Binder resin | | | | |
| YL-932 | 100 | 90 | 100 | — |
| HP-4032D | — | — | — | 100 |
| Epicron B4400 | — | 10 | — | — |
| XL-42 | — | — | — | — |
| Varnish used | Examples 3 | Examples 4 | Examples 5 | Examples 6 |
| Cure accelerator (in binder) | | | | |
| Aluminum chelate A | 0.1 | — | — | — |
| ALCH-TR | — | 0.1 | — | — |
| 2E4MZ | — | — | 0.1 | — |
| U-CAT 5003 | — | — | — | 0.1 |
| SI-100 | — | — | — | — |
| SH6018 | — | — | — | — |

|  | Examples | | | |
| --- | --- | --- | --- | --- |
|  | 13 | 14 | 15 | 16 |
| Binder resin | | | | |
| YL-932 | — | 50 | 100 | 90 |
| HP-4032D | 100 | 50 | — | — |
| Epicron B4400 | — | — | — | — |
| XL-42 | — | — | — | 10 |
| Varnish used | Examples 7 | Examples 8 | Examples 3 | Examples 3 |
| Cure accelerator (in binder) | | | | |
| Aluminum chelate A | 0.1 | — | — | 0.1 |
| ALCH-TR | — | 0.1 | — | — |
| 2E4MZ | — | — | — | — |
| U-CAT 5003 | — | — | — | — |
| SI-100 | — | — | — | — |
| SH6018 | 0.1 | — | — | — |

TABLE 6

|  | Comp. Examples | | | |
| --- | --- | --- | --- | --- |
|  | 11 | 12 | 13 | 14 |
| Binder resin | | | | |
| YL-932 | 160 | 100 | — | 100 |
| HP-4032D | — | — | 90 | — |
| Epicron B4400 | — | — | 10 | — |
| XL-42 | — | — | — | — |
| Varnish used | Examples 1 | Examples 2 | Examples 3 | Examples 4 |
| Cure accelerator (in binder) | | | | |
| Aluminum chelate A | 0.1 | — | — | — |
| ALCH-TR | — | — | — | — |
| 2E4Mz | — | 0.1 | — | — |
| U-CAT 5003 | — | — | 0.1 | — |
| SI-100 | — | — | — | 0.1 |
| SH6018 | — | — | — | — |

In Tables 5 and 6, Epicron B4400 shown therein denotes a solid acid anhydride (acid anhydride equivalent: 132; Dainippon Ink and Chemical Co., Ltd.), XL-4L is phenol aralkyl resin (phenol equivalent: 174; Mitsui Toatsu Chemicals Inc.), and SH6018 is organosilane having silanol group (Tohre Silicone Co., Ltd.).

The condition of the insulation coil, the glass transition temperature and bending strength of the insulation layer were investigated on each model coils. The results obtained are shown in the following Tables 7 and 8.

(Condition of the insulation coil)

The condition of resin adhered onto the conductor after curing as well as the condition of interior of the insulation layer (as it was cut off) were visually observed to see if there was any void. When there was no void observed, the insulation layer was determined as being excellent.

(Glass transition temperature)

An insulation layer was sampled from each model coil and the point of change in thermal expansion coefficient was determined by means of TMA (the rate of temperature increase: 5° C./min).

(Bending strength)

The bending strength of each insulation layer was measured according to the test method of JIS K-691.

TABLE 7

|  | Examples | | | | | | | |
| --- | --- | --- | --- | --- | --- | --- | --- | --- |
|  | 9 | 10 | 11 | 12 | 13 | 14 | 15 | 16 |
| Conditions of coil | Good | Good | Good | Good | Good | Good | Good | Good |
| Glass transition temp. (° C.) | 100 | 100 | 110 | 120 | 110 | 100 | 95 | 100 |
| Bending strength [kg/mm$^2$] (100° C.) | 6.1 | 7.2 | 6.4 | 7.5 | 8.0 | 6.2 | 6.0 | 6.3 |

TABLE 8

|  | Comp. Examples | | | |
| --- | --- | --- | --- | --- |
|  | 11 | 12 | 13 | 14 |
| Conditions of coil | Soft | Soft | Soft | Soft |
| Glass transition temp. (° C.) | 10 | 10 | 15 | 10 |
| Bending strength [kg/mm$^2$] (100° C.) | 1.0 | 0.8 | 1.0 | 1.1 |

As seen from Table 7, the insulation coils (Examples 9 to 16) manufactured using the resin compositions of this invention all indicated a dense insulation layer which was free from void irrespective of the kinds of cure accelerator included in the binder. Further, the glass transition point was also as high as 100° C. in most cases and the bending strength was also as high as 6.0 at a temperature of 100° C. or more, thus indicating an excellent bending strength even under the actual operation conditions.

On the other hand, as seen from Table 8, in the case of the resin compositions of Comparative Examples (11 to 14) where epibis type epoxy compounds were mixed therein, the curing of the resin composition was hindered depending on the combination between the cure accelerator incorporated in the impregnation resin composition and the cure accelerator incorporated in the binder resin, thus generating voids in the insulation layer. Further, the glass transition point was 20° C. or less in all of the insulation layers, and the bending strength thereof was at most 1.0.

Then, the resin compositions of Examples (17 to 19) and Comparative Examples (15 to 17) were prepared as shown in the following Table 9 using the epoxy resins each differing in content of ionic impurities as to investigate the storage stability of each resin composition. The results obtained are shown in Table 9 together with the concentration of the ionic impurities.

TABLE 9

|  |  | Examples | | | | Comp. Examples | | |
| --- | --- | --- | --- | --- | --- | --- | --- | --- |
|  |  | 2 | 17 | 18 | 19 | 15 | 16 | 17 |
| Epoxy resin | Araldyte CY 179 | — | 15 | 15 | 25 | — | 45 | 47 |
|  | Celoxide 2021P | 45 | 30 | 30 | 20 | — | — | — |
|  | ERL4221 | — | — | — | — | 45 | — | — |
|  | Celoxide 2021 | — | — | — | — | — | — | — |
|  | BGE | 15 | 15 | 15 | 15 | 15 | 15 | — |
| Acid anhydride | QH200 | 40 | 40 | — | 40 | 40 | 40 | 53 |
|  | MH700 | — | — | 40 | — | — | — | — |
| Cure accelerator | Aluminum chelate A | 0.1 | 0.1 | 0.1 | 0.1 | 0.1 | 0.1 | 0.2 |
|  | ALCH-TR | — | — | — | — | — | — | — |
|  | AlBA | — | — | — | — | — | — | — |
|  | Al(sa)$_3$ | — | — | — | — | — | — | — |
| Storage stability (days) |  | 150 | 145 | 140 | 125 | 100 | 50 | 35 |
| Conc. (ppm) of ion impurities in epoxy resin |  | 12 | 23 | 23 | 30 | 35 | 45 | 47 |

It will be seen from the results shown in Table 9 that the lower the concentration of ion component in the epoxy compound was, the more excellent was the storage stability of the resin composition. Specifically, the resin compositions (Examples 2, 17 to 19) of this invention where the concentration of ion component was 30 ppm or less indicated the storage stability of 125 days or more. By contrast, the resin composition of Comparative Example 17 where the concentration of ion component was 47 ppm indicated the storage stability of as short as 35 days.

The storage stability of the resin composition should desirably be 90 days or more. It has been found out by the present inventors that the ionic impurity in the epoxy resin induces the deterioration of storage stability, so that the concentration of ionic impurities in the epoxy resin should be limited at most to 30 ppm.

Further, the compositions were prepared by incorporating therein a compound having Si—H bond (phenylsilane) or a compound having O—O bond (DCP) according to the formulations shown in the following Table 10 to investigate the storage stability and gelling time of the resin compositions. The results obtained are summarized in the following Table 10.

TABLE 10

|  |  | Examples | | | | |
| --- | --- | --- | --- | --- | --- | --- |
|  |  | 2 | 20 | 21 | 22 | 23 |
| Epoxy resin | Araldyte CY 179 | — | — | — | — | — |
|  | Celoxide 2021P | 45 | 45 | 45 | 45 | 45 |
|  | ERL4221 | — | — | — | — | — |
|  | Celoxide 2021 | — | — | — | — | — |
|  | BGE | 15 | 15 | 15 | 15 | 15 |
| Acid anhydride | QH200 | 40 | 40 | — | 40 | 40 |
|  | MH700 | — | — | 40 | — | 40 |
| Cure accelerator | Aluminum chelate A | 0.1 | 0.1 | 0.1 | — | — |
|  | ALCH-TR | — | — | — | 0.1 | 0.1 |
|  | AlBA | — | — | — | — | — |
|  | DCP | — | — | 0.1 | — | 0.1 |
|  | Phenyl silane | — | 0.1 | — | 0.1 | — |
| Storage stability (days) |  | 150 | 120 | 140 | 120 | 140 |
| Gelling time (min.) |  | 70 | 50 | 50 | 55 | 50 |

It will be seen from the results shown in Table 10 that the gelling time can be shortened, while maintaining an excellent storage stability, by employing a resin composition containing a compound having Si—H bond (phenylsilane) or a compound having O—O bond (DCP).

As explained above, it is possible according to this invention to provide an impregnation resin composition, which is excellent in long-term storage stability, in short-time curability and in impregnation property, and which is capable of exhibiting excellent electric and mechanical properties. It is also possible according to this invention to form a voidless and highly dense insulation layer exhibiting an excellent insulating property, a high glass transition temperature and a high bending strength.

The insulation layer is particularly suited for use in an insulation coil of a revolving electric equipment for vehicle or general industry, and of a stationary induction electric apparatus such as a transformer. Therefore, this invention is very valuable in industrial view point.

Additional advantages and modifications will readily occur to those skilled in the art. Therefore, the invention in its broader aspects is not limited to the specific details and representative embodiments shown and described herein. Accordingly, various modifications may be made without departing from the spirit of scope of the general inventive concept as defined by the appended claims and their equivalents.

We claim:

1. An impregnation resin composition comprising:
   20–70% of an alicyclic epoxy compound;
   an acid anhydride curing agent;
   0.001–1.0% of an aluminum compound having an organic group; and
   1–30% of butylglycidyl ether;
   wherein said alicyclic epoxy compound contains not more than 30 ppm in concentration of Na ion component.

2. The impregnation resin composition according to claim 1, wherein said alicyclic epoxy compound is at least one kind of compound selected from the compounds represented by the following general formulas (2) and (3):

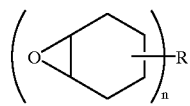
(2)

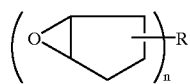
(3)

wherein R is an organic group which is capable of linking two or more epoxidized rings; n is an integer of 1 or more.

3. The impregnation resin composition according to claim 2, wherein said alicyclic epoxy compound is at least one kind of compound selected from the compounds represented by the following general formulas:

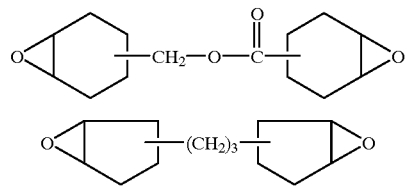

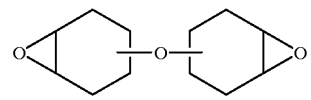

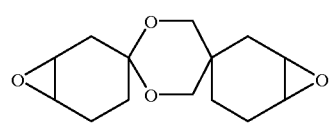

4. The impregnation resin composition according to claim 3, wherein said alicyclic epoxy compound is a compound represented by the following general formula (1):

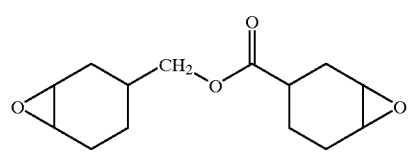
(1)

5. The impregnation resin composition according to claim 1, wherein said alicyclic epoxy compound is 200 or less in epoxy equivalent.

6. The impregnation resin composition according to claim 1, which further comprises a compound having an Si—H bond.

7. The impregnation resin composition according to claim 1, which further comprises a compound having an O—O bond.

8. The impregnation resin composition according to claim 1, wherein the viscosity of said resin composition is in the range of 20 to 500 cps.

9. The impregnation resin composition according to claim 1, wherein said aluminum compound having an organic group is aluminum trisacetylacetonate.

10. The impregnation resin composition according to claim 1, wherein said organic group of said aluminum compound is selected from the group consisting of alkoxy, phenoxy, acyloxy, β-diketonato, and o-carbonylphenylato.

11. A method of preparing a thermosetting varnish, comprising:
    mixing 20–70% of an alicyclic epoxy compound, an acid anhydride curing agent, 0.001–1.0% of an aluminum compound having an organic group, and 1–30% of butylglycidyl ether;
    wherein said alicyclic epoxy compound contains not more than 30 ppm in concentration of Na ion component.

12. A method of preparing a cured resin, comprising:
    preparing a thermosetting varnish by the method of claim 11; and curing said thermosetting varnish.

* * * * *